(12) United States Patent
Endo

(10) Patent No.: US 10,061,498 B2
(45) Date of Patent: Aug. 28, 2018

(54) GRAPH DISPLAY DEVICE, GRAPH DISPLAY METHOD AND COMPUTER-READABLE MEDIUM RECORDING CONTROL PROGRAM

(71) Applicant: CASIO COMPUTER CO., LTD., Shibuya-ku, Tokyo (JP)

(72) Inventor: Kota Endo, Hachioji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 389 days.

(21) Appl. No.: 14/254,594

(22) Filed: Apr. 16, 2014

(65) Prior Publication Data

US 2014/0317570 A1 Oct. 23, 2014

(30) Foreign Application Priority Data

Apr. 22, 2013 (JP) ................................. 2013-089545

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0488* (2013.01); *G06F 15/0225* (2013.01); *G06T 11/206* (2013.01)

(58) Field of Classification Search
CPC .......................... G06F 3/04847; G06F 3/0488
See application file for complete search history.

(56) References Cited

U.S. PATENT DOCUMENTS 3,789,203 A 1/1974 Catherall et al.
4,217,702 A 8/1980 Bennett
(Continued)

FOREIGN PATENT DOCUMENTS

CN 101030119 A 9/2007
JP 06052278 A 2/1994
(Continued)

OTHER PUBLICATIONS

Fluidmath-1, Mar. 2, 2011, https://www.youtube.com/watch?v=BAFGONn4KoQ.*
(Continued)

*Primary Examiner* — Jeffrey A Gaffin
*Assistant Examiner* — Mohamed Abou El Seoud
(74) *Attorney, Agent, or Firm* — Holtz, Holtz & Volek PC

(57) ABSTRACT

A graph display device includes an expression input unit, a graph display control unit, first and second display control units and a coefficient changed graph display control unit. The expression input unit recognizes a functional expression. The graph display control unit displays a graph corresponding to the recognized functional expression in a display part. The first display control unit displays a first user interface object for changing a numeric value set to a variable when a coefficient in the functional expression is the variable. The second display control unit displays a second user interface object for changing a numeric value as a constant when a coefficient in the functional expression is the constant. The coefficient changed graph display control unit displays a graph corresponding to the functional expression in which a numeric value changed by the first or second user interface object is set as a coefficient value.

18 Claims, 9 Drawing Sheets

(51) Int. Cl.
  *G06F 15/02* (2006.01)
  *G06F 3/0488* (2013.01)
  *G06T 11/20* (2006.01)

(56) References Cited

U.S. PATENT DOCUMENTS

| | | | |
|---|---|---|---|
| 4,794,553 A | 12/1988 | Watanabe et al. | |
| 5,136,690 A | 8/1992 | Becker et al. | |
| 5,289,205 A | 2/1994 | Torres | |
| 5,303,338 A * | 4/1994 | Handa | G06F 15/0225 |
| | | | 345/440 |
| 5,510,995 A | 4/1996 | Oliver | |
| 5,532,946 A | 7/1996 | Phipps et al. | |
| 5,539,427 A | 7/1996 | Bricklin et al. | |
| 5,539,867 A | 7/1996 | Handa et al. | |
| 5,553,225 A | 9/1996 | Perry | |
| 5,739,823 A | 4/1998 | Akaza et al. | |
| 5,825,355 A * | 10/1998 | Palmer | G06F 3/0481 |
| | | | 715/708 |
| 5,999,193 A | 12/1999 | Conley et al. | |
| 6,133,924 A | 10/2000 | Ito et al. | |
| 6,208,343 B1 | 3/2001 | Roth | |
| 6,256,595 B1 | 7/2001 | Schwalb et al. | |
| 6,429,869 B1 | 8/2002 | Kamakura et al. | |
| 6,532,469 B1 | 3/2003 | Feldman et al. | |
| 6,549,923 B1 | 4/2003 | Sudoh | |
| 6,918,768 B2 | 7/2005 | Bardige et al. | |
| 6,922,816 B1 | 7/2005 | Amin et al. | |
| 6,941,359 B1 | 9/2005 | Beaudoin et al. | |
| 7,289,120 B2 | 10/2007 | Fukaya | |
| 7,747,981 B2 | 6/2010 | Gray | |
| 7,765,491 B1 | 7/2010 | Cotterill | |
| 8,089,482 B1 | 1/2012 | Axelrod | |
| 8,259,115 B2 | 9/2012 | Okano | |
| 8,407,580 B2 | 3/2013 | Gray et al. | |
| 8,413,116 B2 | 4/2013 | Gray | |
| 9,098,858 B2 | 8/2015 | Xia et al. | |
| 9,202,433 B2 | 12/2015 | Webb et al. | |
| 9,507,495 B2 * | 11/2016 | Johansson | G06F 3/0482 |
| 2002/0016697 A1 | 2/2002 | Nishigaki et al. | |
| 2003/0182333 A1 | 9/2003 | Good et al. | |
| 2004/0083247 A1 * | 4/2004 | Koont | G06F 15/0225 |
| | | | 708/160 |
| 2004/0114258 A1 | 6/2004 | Harris, III et al. | |
| 2004/0135826 A1 | 7/2004 | Pickering | |
| 2004/0227738 A1 | 11/2004 | Sudoh | |
| 2005/0071785 A1 * | 3/2005 | Chadzelek | G06F 9/4443 |
| | | | 715/854 |
| 2005/0108234 A1 * | 5/2005 | Oksanen | G06F 3/0485 |
| 2006/0204139 A1 | 9/2006 | Hayashi | |
| 2006/0253795 A1 | 11/2006 | Titov et al. | |
| 2007/0046674 A1 | 3/2007 | Sudoh | |
| 2007/0073705 A1 | 3/2007 | Gray | |
| 2007/0153001 A1 | 7/2007 | Yu et al. | |
| 2007/0195093 A1 | 8/2007 | Springer et al. | |
| 2007/0198620 A1 | 8/2007 | Nilakantan et al. | |
| 2007/0298389 A1 | 12/2007 | Yu et al. | |
| 2008/0143746 A1 | 6/2008 | Irons | |
| 2008/0250347 A1 | 10/2008 | Gray et al. | |
| 2008/0256489 A1 | 10/2008 | Maurer et al. | |
| 2009/0063206 A1 | 3/2009 | Payne et al. | |
| 2009/0073173 A1 | 3/2009 | Nakamura et al. | |
| 2009/0102846 A1 | 4/2009 | Flockermann et al. | |
| 2009/0115782 A1 | 5/2009 | Irons et al. | |
| 2009/0164886 A1 | 6/2009 | Shah et al. | |
| 2009/0281645 A1 | 11/2009 | Kitahara et al. | |
| 2009/0307587 A1 * | 12/2009 | Kaneko | G06F 3/0486 |
| | | | 715/700 |
| 2010/0070931 A1 | 3/2010 | Nichols | |
| 2010/0099462 A1 | 4/2010 | Baek et al. | |
| 2010/0156830 A1 | 6/2010 | Homma et al. | |
| 2010/0231596 A1 | 9/2010 | Matsuda | |
| 2011/0004864 A1 * | 1/2011 | Gray | G06F 9/4443 |
| | | | 717/108 |
| 2011/0043517 A1 | 2/2011 | Schneider et al. | |
| 2011/0227946 A1 * | 9/2011 | Yoshizawa | G06F 15/02 |
| | | | 345/636 |
| 2011/0246943 A1 | 10/2011 | Fujibayashi | |
| 2011/0254862 A1 | 10/2011 | Okano | |
| 2011/0283188 A1 | 11/2011 | Farrenkopf et al. | |
| 2012/0030626 A1 | 2/2012 | Hopkins et al. | |
| 2012/0050328 A1 | 3/2012 | Karoji | |
| 2012/0159370 A1 | 6/2012 | Rode et al. | |
| 2012/0306879 A1 | 12/2012 | Yokoyama | |
| 2013/0050064 A1 | 2/2013 | Okano | |
| 2013/0097551 A1 | 4/2013 | Hogan | |
| 2013/0235069 A1 | 9/2013 | Ubillos et al. | |
| 2013/0268263 A1 | 10/2013 | Park et al. | |
| 2014/0075380 A1 | 3/2014 | Milirud et al. | |
| 2014/0096056 A1 * | 4/2014 | Latzina | G06F 17/30572 |
| | | | 715/771 |
| 2014/0253542 A1 | 9/2014 | Jung et al. | |
| 2014/0282252 A1 | 9/2014 | Edwards et al. | |
| 2014/0359516 A1 | 12/2014 | O'Donoghue | |
| 2014/0365947 A1 | 12/2014 | Karoji | |
| 2015/0170372 A1 | 6/2015 | Rubins et al. | |
| 2015/0187105 A1 | 7/2015 | Endo et al. | |
| 2015/0187106 A1 | 7/2015 | Endo | |
| 2015/0268845 A1 | 9/2015 | Endo | |
| 2015/0310646 A1 | 10/2015 | Karoji et al. | |
| 2016/0004423 A1 | 1/2016 | Springer et al. | |
| 2016/0041944 A1 | 2/2016 | Karoji | |
| 2016/0077725 A1 | 3/2016 | Maeda | |

FOREIGN PATENT DOCUMENTS

| | | |
|---|---|---|
| JP | 08179749 A | 7/1996 |
| JP | 09050273 A | 2/1997 |
| JP | 09185586 A | 7/1997 |
| JP | 09198224 A | 7/1997 |
| JP | 09-282475 A | 10/1997 |
| JP | 11184822 A | 7/1999 |
| JP | 11328279 A | 11/1999 |
| JP | 2001350731 A | 12/2001 |
| JP | 2002117084 A | 4/2002 |
| JP | 2004199260 A | 7/2004 |
| JP | 2004206541 A | 7/2004 |
| JP | 2004326691 A | 11/2004 |
| JP | 2005107862 A | 4/2005 |
| JP | 2005107908 A | 4/2005 |
| JP | 2005107987 A | 4/2005 |
| JP | 2005182125 A | 7/2005 |
| JP | 2011181050 A | 9/2011 |
| JP | 2011185911 A | 9/2011 |
| JP | 2012014440 A | 1/2012 |
| JP | 2012203605 A | 10/2012 |
| JP | 2013045147 A | 3/2013 |
| JP | 2013050746 A | 3/2013 |
| JP | 2013178846 A | 9/2013 |
| WO | 2004029791 A2 | 4/2004 |

OTHER PUBLICATIONS

Fluidmath-2, Sep. 20, 2012, https://www.youtube.com/watch?v=Nz8WP-NVXJc.*
Fluidmath-3, Feb. 25, 2012, https://www.youtube.com/watch?v=LRqOBK03g2E.*
Sketch2Graph, Nov. 30, 2012, https://www.youtube.com/watch?v=Oss1MPU-TBE.*
Rgilesmath7, Vertex Form With FluidMath, Jan. 17, 2011, https://www.youtube.com/watch?v=17U7hWwhM-U.*
U.S. Appl. No. 14/854,773; First Named Inventor: Naoya Maeda; Title: "Figure Display Apparatus, Figure Display Method, and Storage Medium Storing Figure Display Program"; Filed: Sep. 15, 2015.
U.S. Appl. No. 14/298,586; First Named Inventor Kosuke Karoji; Title: "Electronic Apparatus, Graph Display Method and Computer Readable Medium"; Filed: Jun. 6, 2014.
U.S. Appl. No. 14/574,141; First Named Inventor: Kota Endo; Title: "Graph Display Control Device, Electronic Device, Graph Display Method and Storage Medium Recording Graph Display Control Processing Program"; Filed: Dec. 17, 2014.

(56) References Cited

OTHER PUBLICATIONS

U.S. Appl. No. 14/582,129; First Named Inventor: Kota Endo; Title: Graph Display Control Apparatus, Electronic Device, Graph Display Method, and Storage Medium Storing Graph Display Control Process Program; Filed: Dec. 23, 2014.
U.S. Appl. No. 14/657,851; First Named Inventor: Kota Endo; Title: "Graphic Drawing Device and Recording Medium Storing Graphic Drawing Program"; Filed: Mar. 13, 2015.
U.S. Appl. No. 14/807,702; First Named Inventor: Kosuke Karoji; Title: "Graph Display Apparatus, Graph Display Method and Program Recording Medium" Filed: Jul. 23, 2015.
"Desmos", Desmos User Guide, http://s3.amazonaws.com/desmos/Desmos_Calculator_User_Guide_pdf, Feb. 2, 2013, 1-10.
Page, "Quadratic curve and graph display (standard form)", Math Open Reference, Jan. 1, 2009.
Chinese Office Action (and English Translation thereof) dated Aug. 25, 2016 issued in counterpart Chinese Application No. 201410162794.1.
Extended European Search Report (EESR) dated Oct. 17, 2016 issued in counterpart European Application No. 14163394.1.
U.S. Appl. No. 14/854,773; First Named Inventor: Naoya Maeda; Title: "Figure Display Apparatus, Figure Display Method, and Storage Medium Storing Figure Display Program"; Filed: Sep. 5, 2015.
Graphing the Derivative as appearing on Nov. 15, 2013, available as http://web.archive.org/web/20131115154629/http://www.zweigmedia.com/RealWorld/calctopic1/derivgraph.html.
Hohenwarter, et al., "Introduction to Geogebra Version 4.4", International Geogebra Institute, 2013. Web. May 25, 2017.

\* cited by examiner

GRAPH DISPLAY DEVICE, GRAPH DISPLAY METHOD AND COMPUTER-READABLE MEDIUM RECORDING CONTROL PROGRAM

CROSS-REFERENCE TO RELATED APPLICATION

This application claims priority based on Japanese Patent Application No. 2013-089545, filed on Apr. 22, 2013, the entire contents of which are incorporated by reference herein.

BACKGROUND OF THE INVENTION

1. Field of the Invention

The present invention relates to a graph display device for displaying a graph corresponding to a functional expression.

2. Description of the Related Art

Usually, a scientific calculator (a graphing calculator) provided with a graph display function is merchandised as a product. In this calculator, when a user inputs an arbitrary functional expression y=f(x), a graph corresponding to the inputted functional expression is displayed on a display part.

Further, a graphing calculator is thought about in which under a state that a quadratic functional expression of $Y=X^2+AX-1$ is inputted, graphs obtained when a value of a coefficient A is changed are displayed in a display part in order (for instance, patent literature 1: JP-A-9-282475). In this case, a screen exclusively used to set the value of the coefficient A is displayed. In the exclusive screen, a user inputs an initial value (Start), a final value (End) and a change space (Pitch) of the coefficient A.

As described above, usually, when the value of the coefficient included in the functional expression is changed, the exclusive screen needs to be displayed to set the value of the coefficient so as to carry out respectively setting operations of the values. Thus, a troublesome operation is necessary.

Further, in order to change the value or the change space of the coefficient which is set once, a problem arises that the screen needs to be displayed again and the value or the change space needs to be reset, so that it takes extremely much time and labor.

The present invention is devised by considering the above-described problems and it is an object of the present invention to provide a graph display device which can exceedingly simply change a value of a coefficient included in a functional expression and display a graph corresponding to the change when the graph corresponding to the functional expression is displayed.

SUMMARY OF THE INVENTION

According to one aspect of the present invention, a graph display device includes an expression input unit, a graph display control unit, a first display control unit, a second display control unit and a coefficient changed graph display control unit. The expression input unit recognizes input of a functional expression. The graph display control unit displays a graph corresponding to the functional expression recognized by the expression input unit in a display part. The first display control unit of a user interface object displays a first user interface object for changing a numeric value set to a variable together with the graph in the display part when a coefficient included in the functional expression is the variable. The second display control unit of a user interface object displays a second user interface object for changing a numeric value as a constant together with the graph in the display part in accordance with a user operation after the graph is displayed in the display part when a coefficient included in the functional expression is the constant. The coefficient changed graph display control unit displays, in the display part, a graph corresponding to the functional expression in which a numeric value changed by a user operation of the first user interface object or the second user interface object is set as a value of the coefficient.

According to the present invention, when the graph corresponding to the functional expression is displayed, the value of the coefficient included in the functional expression can be extremely simply changed and the graph corresponding to the change can be displayed.

DETAILED DESCRIPTION OF THE PREFERRED EMBODIMENT

Figure 1:
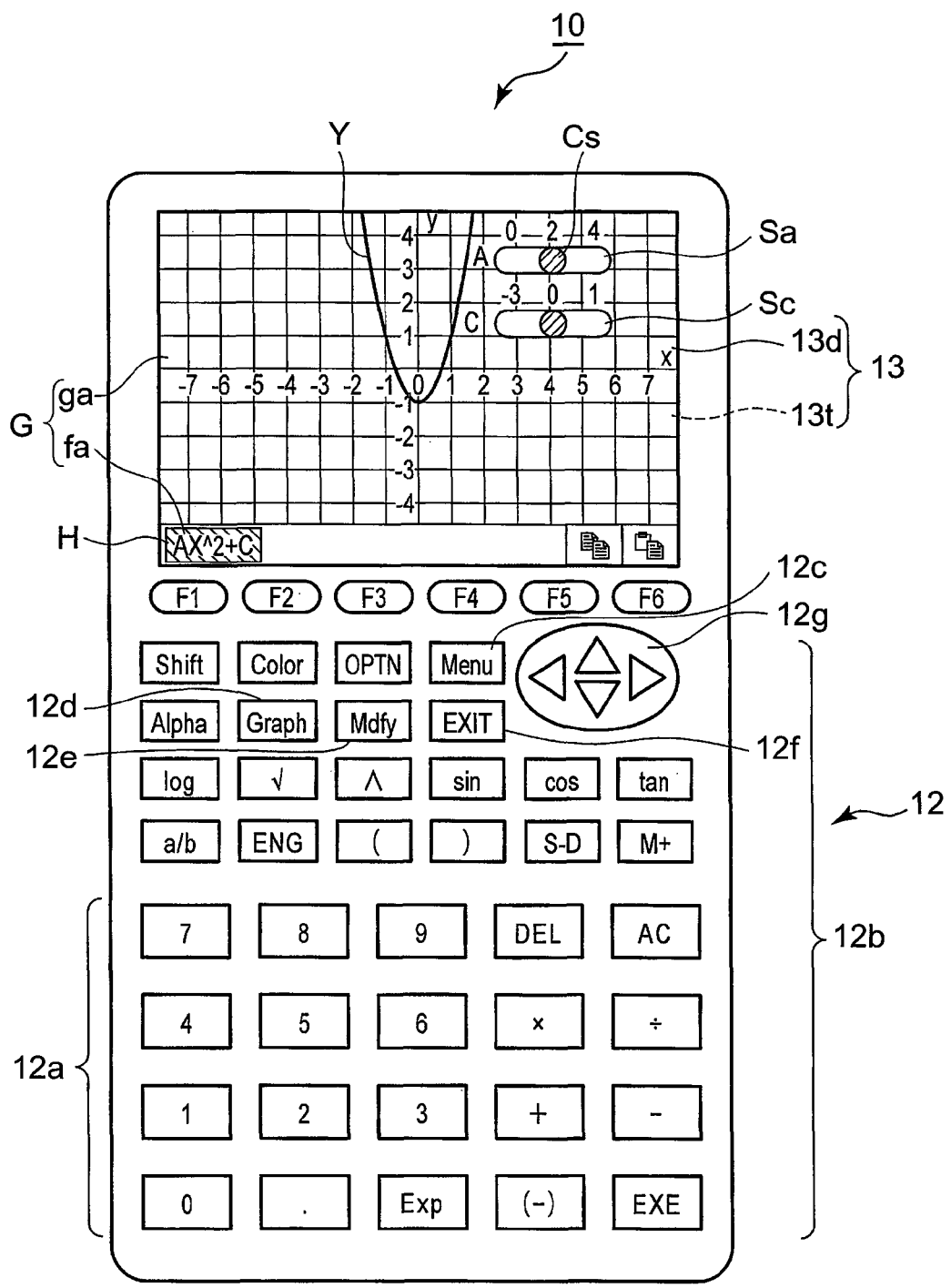
FIG. 1 is a front view showing a structure of an external appearance of a graphing calculator 10 according to an exemplary embodiment of a graph display device of the present invention.

Now, exemplary embodiments of the present invention will be described below by referring to the drawings.

FIG. 1 is a front view showing a structure of an external appearance of a graphing calculator 10 according to an exemplary embodiment of a graph display device of the present invention.

The graph display device is formed as an exclusively used graphing calculator 10 which is described below or formed as a tablet terminal having a display function of a graph corresponding to a functional expression, a portable telephone, a portable game machine or the like.

The graphing calculator 10 has a function which displays an inputted functional expression and a graph corresponding to the functional expression.

In a main body of the graphing calculator 10, a key input part 12 is provided within a range as long as about two-thirds from a lower end of a front surface of the main body. A touch panel display part 13 is provided within a range as long as about one-third from an upper end.

The key input part 12 includes numeric value/symbol keys 12a, function/operator keys 12b, a [Menu] key 12c, a [Graph] key 12d, a [Mdfy] key 12e, an [EXIT] key 12f, a cursor key 12g and function keys [F1] to [F6].

The numeric value/symbol keys 12a include a group of keys for inputting numeric values and symbols which has individual keys such as figures and symbols arranged.

The above-described function/operator keys 12b include various kinds of functional symbol keys operated when arithmetic expressions or functional expressions are inputted or operator keys such as [+], [−], [×], [÷] and [=].

The [Menu] key 12c is operated when a selecting and setting menu of various kinds of operation modes is displayed which include an arithmetic mode to carry out an arithmetic process by inputting an arbitrary calculating expression such as a four arithmetic operation expression or a functional calculating expression, a graph mode to carry out a drawing or plotting process of a graph corresponding to the inputted functional expression, a spreadsheet mode to carry out a spreadsheet calculation and a program mode to carry out a corresponding calculation process by inputting an arbitrary program.

The [Graph] key 12d is operated when an arbitrary graph is drawn in accordance with inputted data.

The [Mdfy] key 12e is operated when a slider (a user interface object) S (see FIGS. 7A, 7B and 7C) is displayed which changes a value of a coefficient if the coefficient of a term included in a functional expression $y=f(x)$ is given as a variable in the graph mode. The slider includes a display object of a lengthy form which shows a range of numeric values and a cursor C which can slide thereon. The numeric value corresponding to a position of the cursor is designated as the coefficient.

The [EXIT] key 12f is a key for slipping out of a present state.

The cursor key ([↑][↓][←][→]) 12g is operated when displayed data is respectively selected or fed or a moving operation of the cursor is carried out.

The function keys [F1] to [F6] are operated when various kinds of selecting menus arranged and displayed along a lower end of a screen of the display part 13 in accordance with a variety of operation modes.

Further, the touch panel display part 13 is formed in such a way that a transparent touch panel 13t is laid on a liquid crystal display screen 13d which can display data in color and has a display range of, for instance, 186 dots in length×378 dots in breadth.

The graphing calculator 10 has a function which displays a slider S (see FIG. 1) which changes a value of a variable within a prescribed range when the coefficient of the term of the functional expression $y=f(x)$ is given as a variable in the graph mode.

Figure 2:
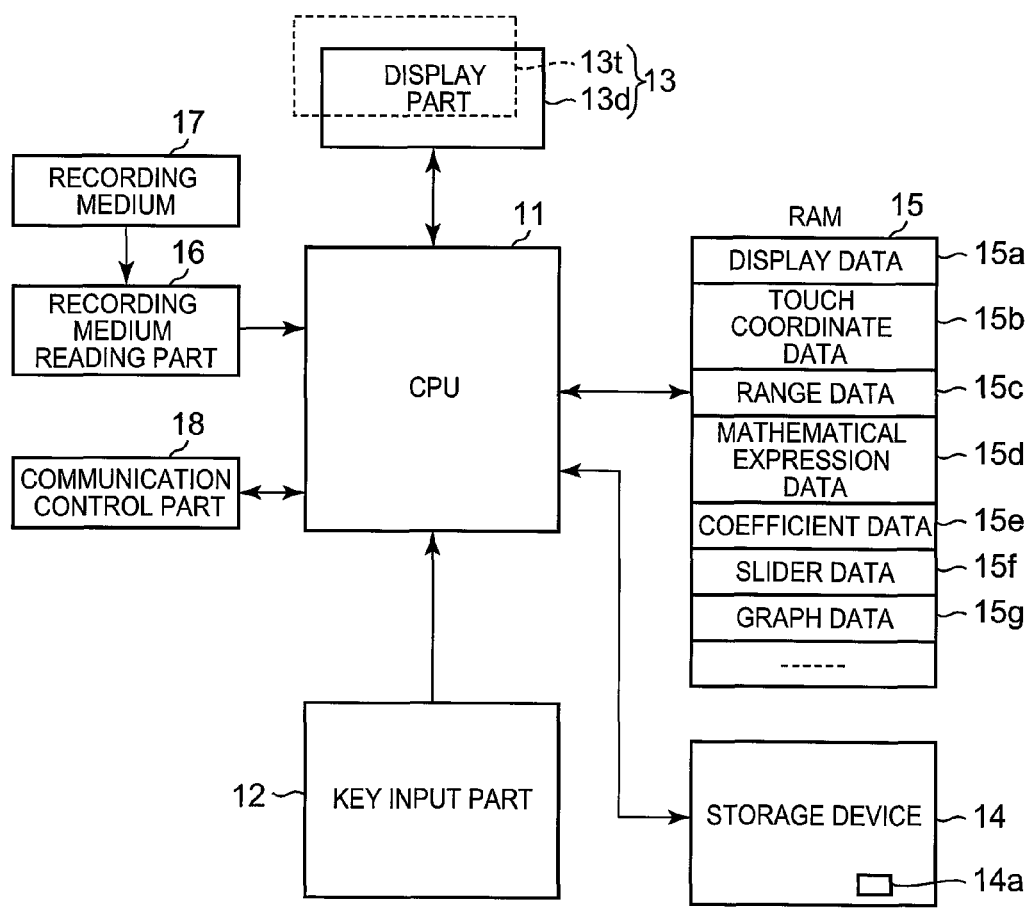
FIG. 2 is a block diagram showing a circuit structure of the graphing calculator 10.

FIG. 2 is a block diagram showing a circuit structure of the graphing calculator 10.

The graphing calculator 10 includes a CPU 11 as a microcomputer.

The CPU 11 controls operations of parts of a circuit respectively by using a RAM 15 as an operating memory in accordance with a calculator control program 14a previously stored in a storage device 14 such as a flash ROM to execute various kinds of functions provided in the graphing calculator 10 such as a calculator function or a function graph display function.

The program may be read in the storage device 14 through a recording medium reading part 16 from an external recording medium 17 such as a memory card, or may be downloaded to the storage device 14 through a communication control part 18 from a Web server (a program server) on a communication network (internet).

To the CPU 11, the storage device 14, the RAM 15, the recording medium reading part 16 and the communication control part 18 are connected as well as the key input part 12 and the touch panel display part 13 shown in FIG. 1.

The RAM 15 stores various types of data necessary for processing operations of the CPU 11. In the RAM 15, are provided a touch coordinate data storage area 15b, a range data storage area 15c, a mathematical expression data storage area 15d, a coefficient data storage area 15e, a slider data storage area 15f and a graph data storage area 15g as well as a display data storage area 15a where data displayed in color on the screen of the touch panel display part 13 is developed.

In the touch coordinate data storage area 15b, coordinate data of a touch position corresponding to a user operation is stored which is detected by the touch panel display part 13.

In the range data storage area 15c, are stored an X coordinate range (Xmin to Xmax) and a Y coordinate range (Ymin to Ymax) set to a graph area ga of a graph display screen G.

In the mathematical expression data storage area 15d, is stored data of the functional expression $y=f(x)$ inputted by operating the key input part 12.

In the coefficient data storage area 15e, is stored data of coefficients of terms respectively included in the functional expression $y=f(x)$ stored in the mathematical expression data storage area 15d.

In the slider data storage area 15f, is stored data of the slider S displayed on the graph area ga in accordance with the coefficient included in the functional expression $y=f(x)$.

In the graph data storage area 15g, is stored data of a graph generated in accordance with the functional expression $y=f(x)$ and the value of the coefficient included in the functional expression $y=f(x)$.

In the graphing calculator 10 formed in such a way as described above, the CPU 11 controls the operations of the parts of the circuit respectively in accordance with instructions of various types of processes recorded in the calculator control program 14a so that software and a hardware operate by cooperating with each other. Thus, the graphing calculator 10 can realize various kinds of functions described in a below-described explanation of an operation.

Now, the operation of the graphing calculator 10 having the above-described structure will be described below.

Figure 3:
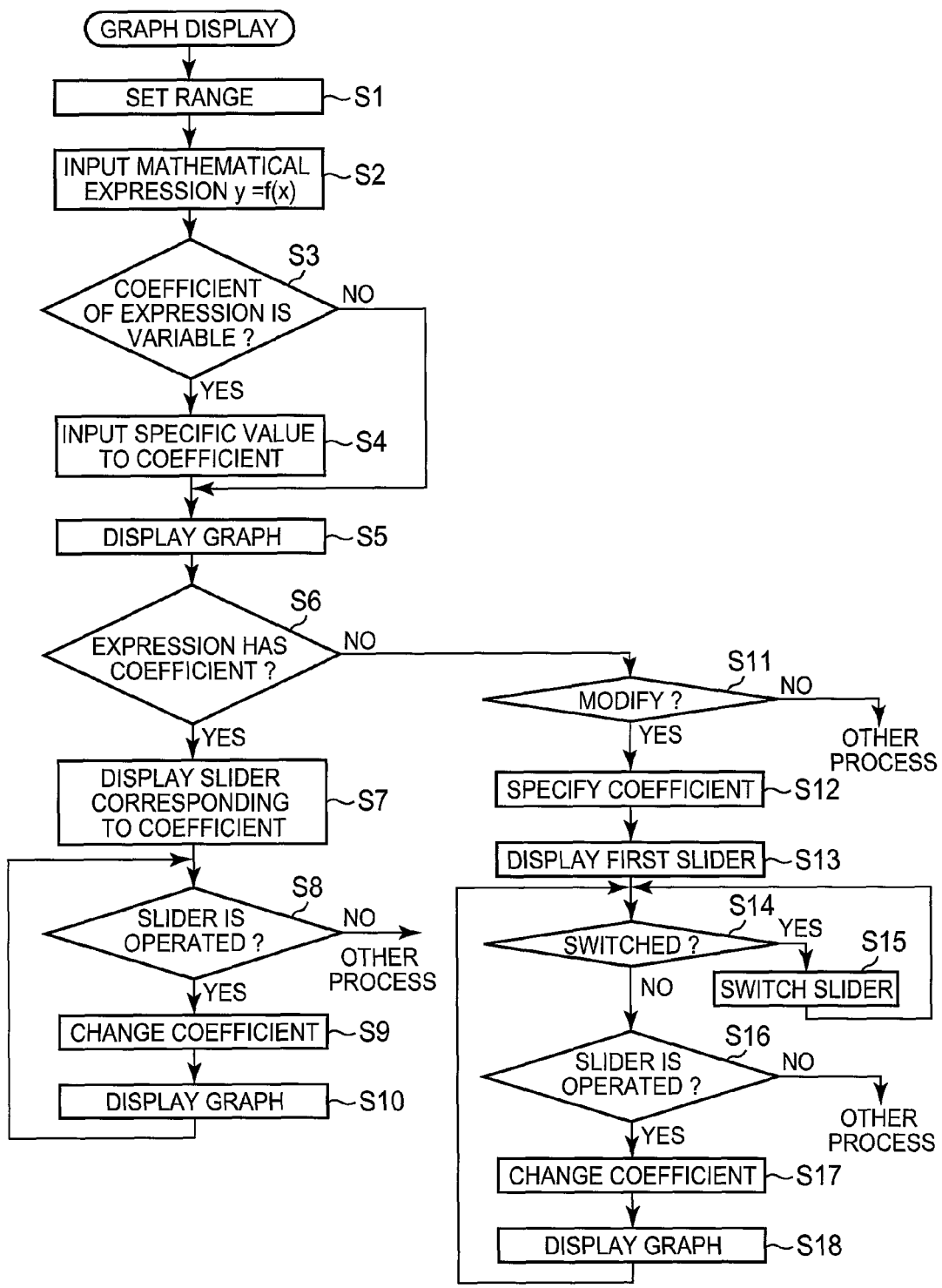
FIG. 3 is a flowchart showing a graph display process of the graphing calculator 10.
Figure 4:
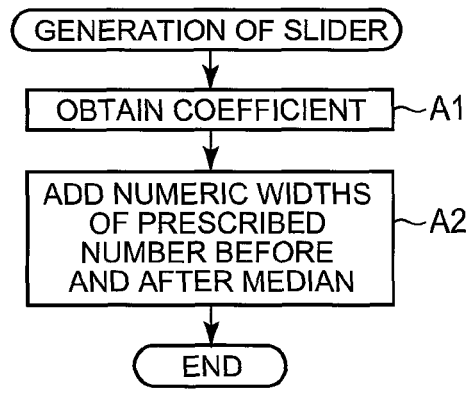
FIG. 4 is a flowchart showing a slider generating process accompanied with the graph display process of the graphing calculator 10.

FIG. 3 is a flowchart showing a graph display process of the graphing calculator 10. FIG. 4 is a flowchart showing a slider generating process of the graphing calculator 10.

Figure 5:
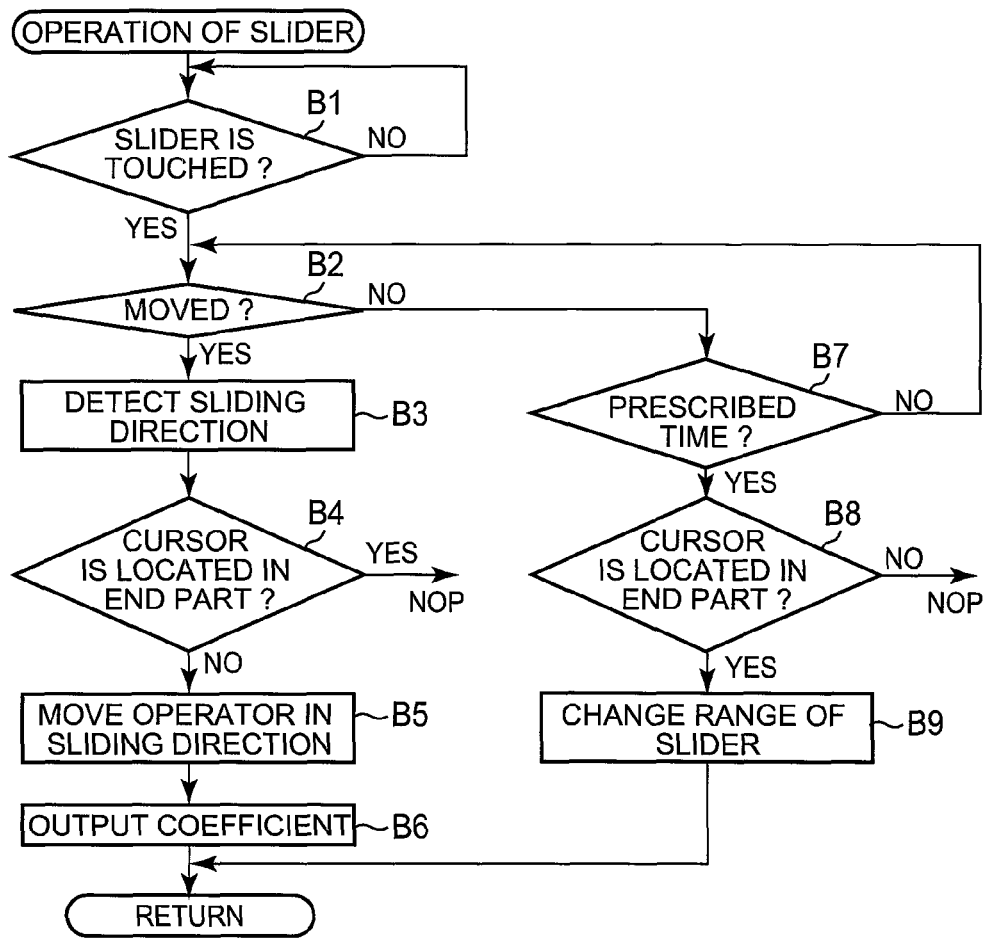
FIG. 5 is a flowchart showing a slider operating process accompanied with the graph display process of the graphing calculator 10.

FIG. 5 is a flowchart showing a slider operating process.

Figure 6A:
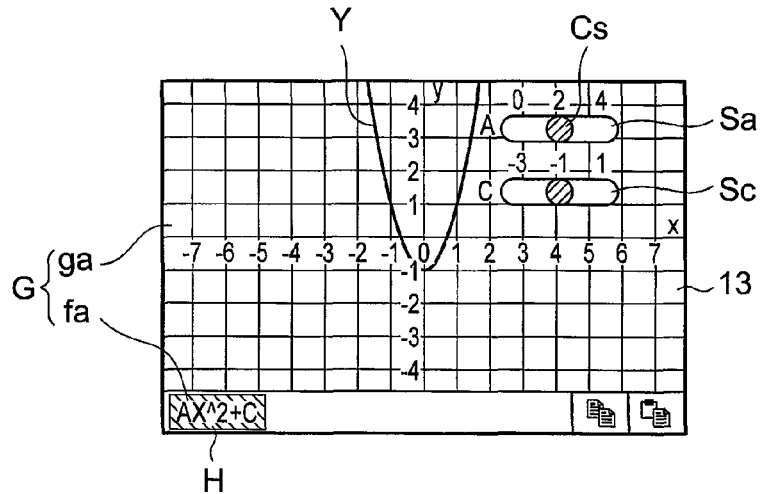
FIGS. 6A, 6B and 6C are diagrams showing graph display operations when a coefficient included in a functional expression inputted in the graph display process of the graphing calculator 10 is a variable.
Figure 6B:
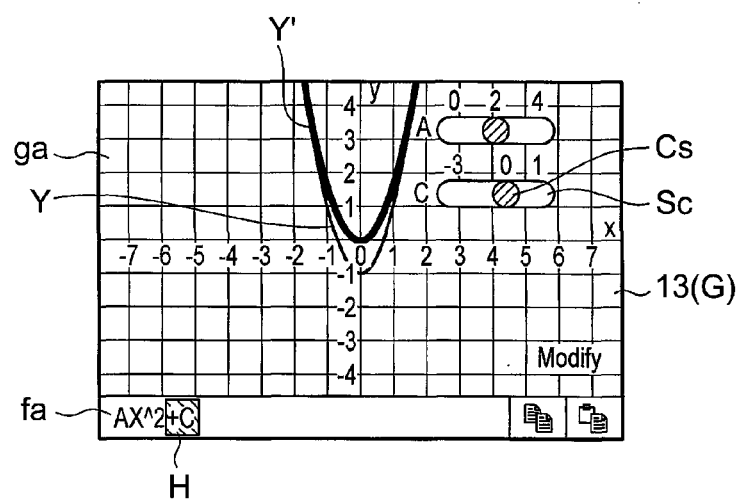
Figure 6C:
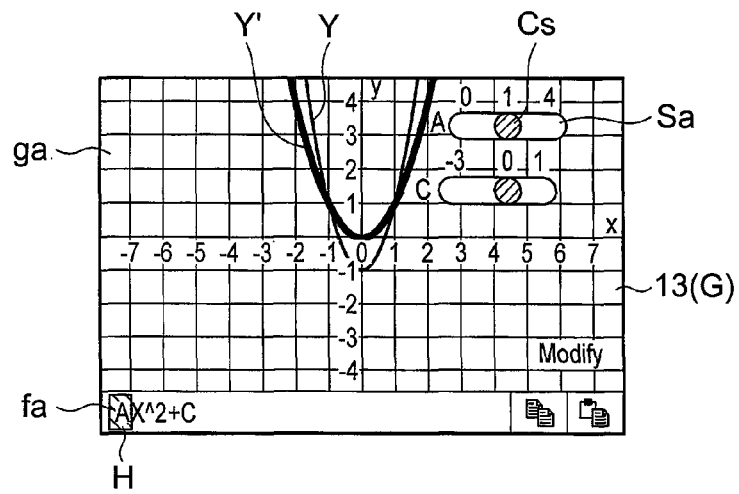

FIGS. 6A, 6B, 6C are diagrams showing graph display operations when the coefficient included in the inputted functional expression is a variable.

When the [Menu] key 12c is operated, a menu screen (not shown in the drawing) is displayed on the touch panel display part 13. When the graph mode is selected from the menu screen, the graph display process shown in FIG. 3 is started. In the graph display process, initially, a coordinate range is set to the graph area ga (step S1). In this step, a setting screen (not shown in the drawing) is displayed, a coordinate range of an X-axis (Xmin to Xmax) and a coordinate range of a Y-axis (Ymin to Ymax) are inputted by a user. The inputted data is stored in the range data storage area 15c to set the coordinate range. In place of the coordinate range data inputted by the user, coordinate range data which is already stored may be directly used.

Thus, as shown in FIG. 6A, on the touch panel display part 13, the graph display screen G is displayed which includes the graph area ga of XY coordinates corresponding to the set coordinate range and a mathematical expression input area fa.

Then, when an arbitrary functional expression is inputted to the mathematical expression input area fa by the user (step S2), it is decided whether or not the functional expression has a coefficient inputted as a variable (a character) (step S3).

For instance, when "$Y=AX^2+C$" is inputted (the step S2), it is decided whether or not there is the coefficient inputted as the variable (the character) in the functional expression "$Y=AX^2+C$" (the step S3).

Here, it is decided that the coefficients A and C are present in the functional expression "$Y=AX^2+C$" (the step S3 (Yes)). Thus, to the coefficients A and C, for instance, specific values (for instance, "A=2", "C=−1") respectively corresponding to the coordinate range are inputted to store the coefficient values in the coefficient data storage area 15e (step S4).

Thus, drawing or plotting data of a graph Y corresponding to the functional expression "$Y=2X^2-1$" which has "A=2", "C=−1" set as the coefficients is generated, the drawing data is stored in the graph data storage area 15g and the graph Y is displayed on the XY coordinates of the graph area ga (step S5).

Here, when it is decided that the inputted functional expression has the coefficient as the variable (step S6 (Yes)), the slider (the user interface object) corresponding to the coefficient is generated and displayed in a space area of the graph area ga (step S7). The generation of the slider will be described in the flowchart shown in FIG. 4.

In a generating process of the slider, numeric value data of the coefficients stored in the coefficient data storage area 15e is obtained (step A1). The value is set as a median and numeric value widths of a prescribed number are added before and after the median to form the slider (step A2).

In the case of the above-described functional expression "$Y=AX^2+C$", the data "2" of the coefficient A stored in the coefficient data storage area 15e is obtained (step A1). The "2" is set as the median and the numeric value widths of the prescribed number "2" are added before and after thereof to generate the slider Sa (a numeric value variable range of 0 to 4) of the coefficient A (step A2).

Further, the data "−1" of the coefficient C is likewise obtained (step A1). The "−1" is set as a median and numeric value widths of a prescribed number "2" are added before and after thereof to generate the slider Sc (a numeric value variable range of −3 to 1) of the coefficient C (step A2).

Then, the generated slider Sa and the slider Sc are displayed in the space area of the graph area ga (step S7). The prescribed number added before and after the obtained coefficient is not limited to "2" and may be changed depending on the states of the coordinate range or a kind of the inputted functional expression.

At this time, in the mathematical expression input area fa, the functional expression "$Y=AX^2+C$" is highlighted.

Then, when the displayed slider Sa of the coefficient A or the slider Sc of the coefficient C is operated by the user, it is decided that the slider is operated (step S8 (Yes)) to change the value of the coefficient A or the value of the coefficient C (step S9). After that, a graph Y' corresponding to the changed coefficient A or the coefficient C is generated and displayed in the graph area ga (step S10). An operation of the slider will be described by using the flowchart shown in FIG. 5.

When it is decided that the slider is touched to move the cursor (steps B1 and B2 (Yes)), a moving direction thereof is detected (step B3). Then, it is decided whether or not the cursor Cs of the slider is already located in an end part of the numeric value variable range in the moving direction (step B4).

Then, when it is decided that the cursor Cs is not located in the end part (step B4 (No)), the cursor Cs is moved in the moving direction and displayed (step B5) and the value of the coefficient is outputted which corresponds to a position of the cursor Cs after the cursor is moved (step B6).

On the other hand, when it is decided that the cursor Cs is located in the end part in the moving direction (step B4 (Yes)), the operation is processed to be invalid (Nop).

Specifically, as shown in FIG. 6B, when the cursor Cs of the slider Sc of the coefficient C is moved rightward so that the value of the coefficient C is changed to "0" and outputted (steps S8 and S9), the graph Y' corresponding to the changed coefficient C (=0) is generated and displayed in the graph area ga (step S10). At this time, in the mathematical expression input area fa, the coefficient C of the functional expression "$Y=AX^2+C$" is highlighted.

After that, as shown in FIG. 6C, the cursor Cs of the slider Sa of the coefficient A is likewise moved leftward so that the value of the coefficient A is changed to "1" and outputted (steps S8 and S9), the graph Y' corresponding to the changed coefficient A (=1) is generated and displayed in the graph area ga (the step S10). At this time, in the mathematical expression input area fa, the coefficient A of the functional expression "$Y=AX^2+C$" is highlighted.

Now, a process will be described below when the coefficient of the term included in the functional expression is given as a constant.

Figure 7A:
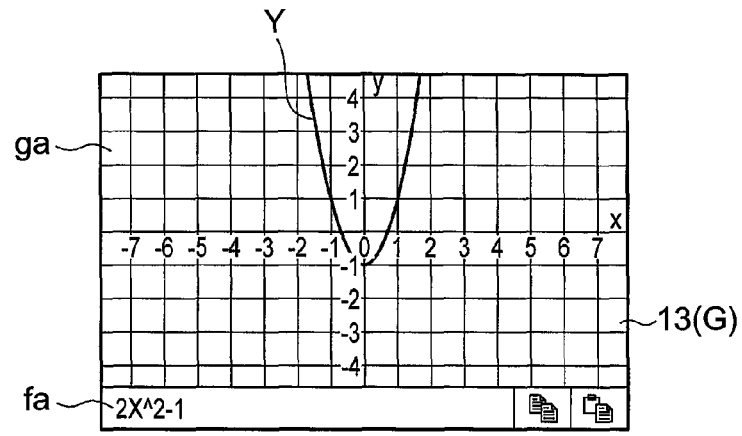
FIGS. 7A, 7B and 7C are diagrams showing graph display operations (No. 1) when a coefficient included in a functional expression inputted in the graph display process of the graphing calculator 10 is a constant.
Figure 7B:
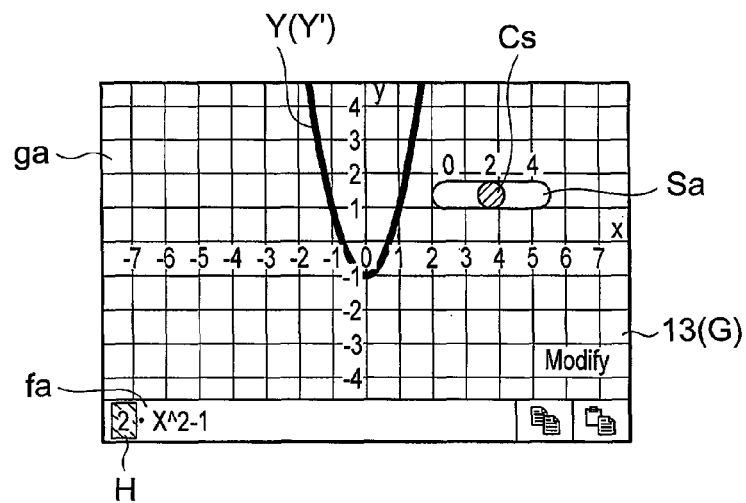
Figure 7C:
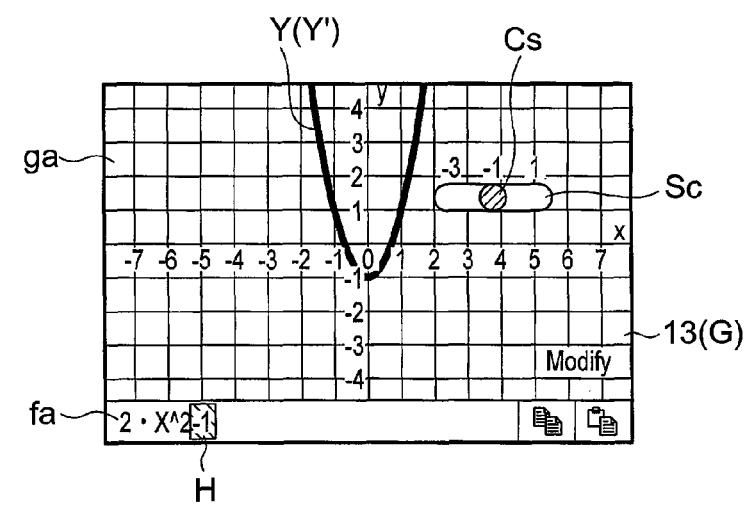

FIGS. 7A, 7B and 7C are diagrams showing graph display operations (No. 1) when the coefficient included in the inputted functional expression is the constant.

Figure 8A:
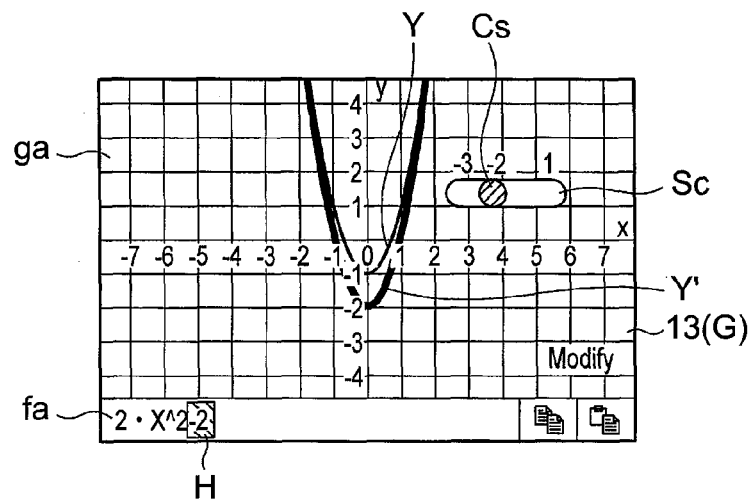
FIGS. 8A, 8B and 8C are diagrams showing graph display operations (No. 2) when a coefficient included in a functional expression inputted in the graph display process of the graphing calculator 10 is a constant.
Figure 8B:
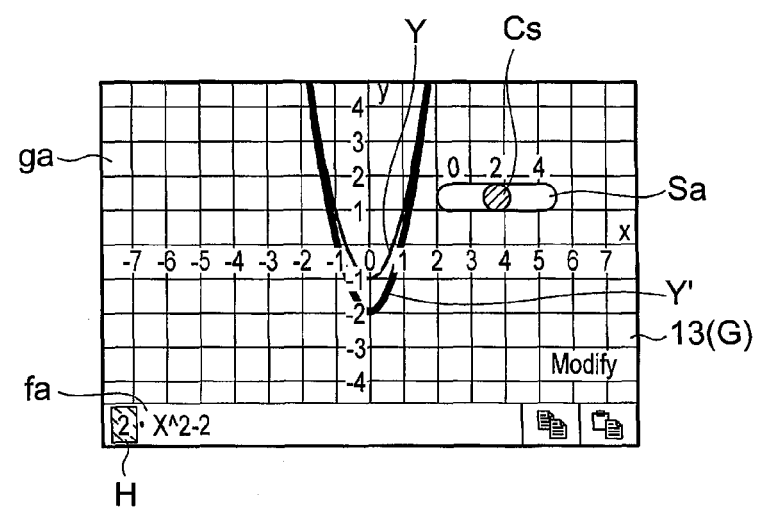
Figure 8C:
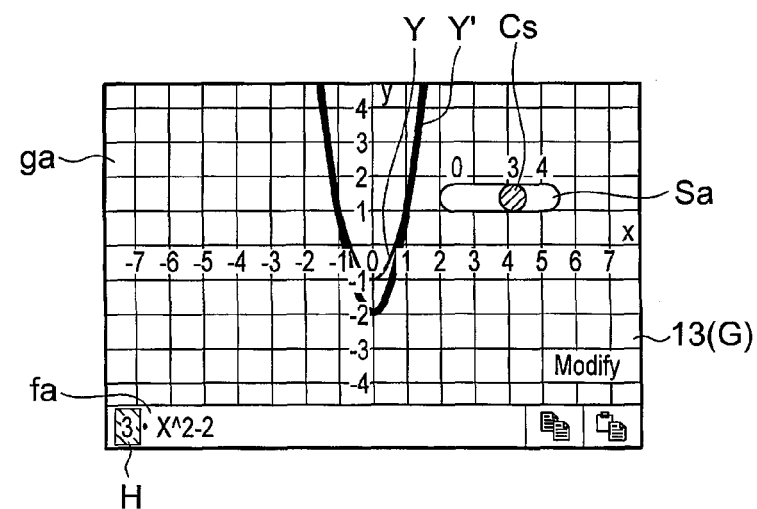

FIGS. 8A, 8B and 8C are diagrams showing graph display operations (No. 2) when the coefficient included in the inputted functional expression is the constant.

When the user inputs the functional expression, for instance, "$Y=2X^2-1$" (step S2), it is decided whether or not there is the coefficient inputted as the variable in the functional expression "$Y=2X^2-1$" (the step S3).

Here, it is decided that there is no coefficient inputted as the variable in the functional expression "$Y=2X^2-1$" (step S3 (No)). Thus, drawing or plotting data of a graph Y corresponding to the functional expression "$Y=2X^2-1$" is generated in accordance with the set coordinate range and the drawing data is stored in the graph data storage area 15g and the graph Y is displayed on the XY coordinates of the graph area ga (step S5).

Here, when it is decided that the inputted functional expression "$Y=2X^2-1$" has no coefficient as the variable (step S6 (No)), the slider is not displayed to set the [Mdfy] key 12e to an input stand-by state (step S11).

Then, when the user desires to display a graph in which the coefficient included in the functional expression is changed, the user operates the [Mdfy] key 12e. When the

[Mdfy] key 12e is operated (step S11 (Yes)), the coefficient of the functional expression is specified (step S12).

Now, an explanation will be given below by setting the coefficient of $X^2$ as "A" and the coefficient of a constant term as "C". Accordingly, in the step S12, "A=2" and "C=−1" are specified and a slider Sa and a slider Sc respectively corresponding to the coefficient A and the coefficient C are generated in the slider generating process shown in FIG. 4.

In the generating process of the slider, the coefficient "2" of $X^2$ of the functional expression is obtained (step A1). The value "2" is set as a median and numeric value widths of a prescribed number "2" are added before and after the median to form the slider Sa (a numeric value variable range of 0 to 4) of the coefficient A (step A2). Further, the constant "−1" of the functional expression is likewise obtained (step A1). The "−1" is set as a median and numeric value widths of a prescribed number "2" are added before and after thereof to generate the slider Sc (a numeric value variable range of −3 to 1) of the coefficient C (step A2).

Then, as shown in FIG. 7B, the slider (the numeric value variable range of 0 to 4) Sa corresponding to the coefficient A of the highest degree term which is initially generated for the above-described functional expression as an object is displayed in the space area of the graph area ga (step S13)

At this time, in the mathematical expression input area fa, the constant "2" of the functional expression "$Y=2X^2-1$" is highlighted so as to show that the numeric value can be changed by the slider Sa.

Here, when the [Mdfy] key 12e is operated again, it is decided that the slider is instructed to be switched (step S14 (Yes)), as shown in FIG. 7C, the slider Sc (the numeric value variable range of −3 to 1) corresponding to the next coefficient C is switched and displayed in the space area of the graph area ga (step S15).

At this time, in the mathematical expression input area fa, the constant "−1" of the functional expression "$Y=2X^2-1$" is highlighted so as to show that the numeric value can be changed by the slider Sc.

Then, as shown in FIG. 8A, when a cursor Cs of the slider Sc is moved leftward so that the value of the coefficient C is changed to "−2" in accordance with the slider operating processes (steps B1 to B6) (steps S16 and S17), a graph Y' corresponding to the changed coefficient C (=−2) is generated and displayed in the graph area ga (step S18).

Here, the [Mdfy] key 12e is operated once again so that it is decided that the slider is instructed to be switched (step S14 (Yes)). Thus, as shown in FIG. 8B, the slider is switched to the slider Sa corresponding to the coefficient A and displayed again (step S15).

Then, as shown in FIG. 8C, a cursor Cs of the slider Sa of the coefficient A is moved rightward so that the value of the coefficient A is changed to "3" (steps S16 and S17) and a graph Y' corresponding to the changed coefficient A (=3) is generated and displayed in the graph area ga (step S18).

Figure 9:
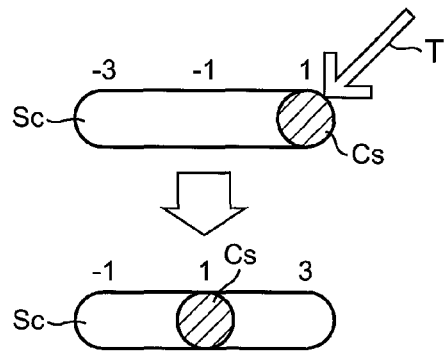
FIG. 9 is a change operation of a numeric value variable range accompanied with the slider operating process of the graphing calculator 10.

FIG. 9 is a diagram showing an operation for changing the numeric value variable range of the slider of the graphing calculator 10.

In the slider operating processes (see FIG. 5), when it is decided that the touch operation to the slider S is detected (step B1 (Yes)), the cursor Cs is not moved (step B2 (No)) and a prescribed time or more elapses (step B7 (Yes)), it is decided whether or not the cursor Cs is located in the end part of the numeric value variable range. When it is decided that the cursor Cs is located in the end part (step B8 (Yes)), the slider is changed to a slider S having the value of the end part newly set as a median and the new slider S is displayed (step B9).

For instance, as shown in an upper section of FIG. 9, when it is decided that the cursor Cs is located in a right end part of the slider Sc and the touch operation in the position of the cursor is continuously held (step B8 (yes)), the slider is changed to the slider Sc having a numeric value variable range (−1 to 3) in which the value "1" at the end part of the numeric value variable range (−3 to 1) is newly set as the median and the new slider Sc is displayed (step B9).

As described above, according to the function of the slider of the graphing calculator 10, when a functional expression "$Y=AX^2+BX+C$" is inputted, since coefficients are inputted as variables (characters) A, B and C, sliders Sa, Sb and Sc respectively corresponding to the coefficients A, B and C are generated and displayed together. Further, when the coefficients included in the functional expression are constants (numeric values), the graph Y corresponding to the functional expression is displayed. When the [Mdfy] key 12e is operated, the sliders Sa, Sb and Sc are generated and sliders S are switched and displayed in order from the slider Sa corresponding to a term of a higher degree side in accordance with an operation of the user. Then, when the values of the coefficients A, B and C are changed in accordance with the operation of the sliders Sa, Sb and Sc by the user, the graph Y' corresponding to the functional expression having the changed value of the coefficient is displayed.

Accordingly, when the graph of the functional expression is displayed, the value of the coefficient included in the functional expression can be extremely simply changed and the graph corresponding to the change can be displayed.

Further, according to the function of the slider, when the cursor Cs the slider S is touched and held in the end part for a prescribed time or more, the slider is changed to the slider having a new numeric value variable range in which the value of the end part is set as a median.

Accordingly, the numeric value variable range of the slider which is displayed once can be easily changed and the graph Y' corresponding to a functional expression having a new coefficient value can be displayed.

In the slider generating process (see FIG. 4) of the above-described exemplary embodiment, a variable range is set which has a predetermined width from a value of a center to form the slider.

As compared therewith, as will be described by referring to FIG. 10 and FIG. 11, a slider may be generated to a displayed graph Y which has a numeric value variable range of a coefficient corresponding to a touched range obtained in such a way that the user directly touches a part of the graph Y desired to be changed and a range thereof.

Figure 10:
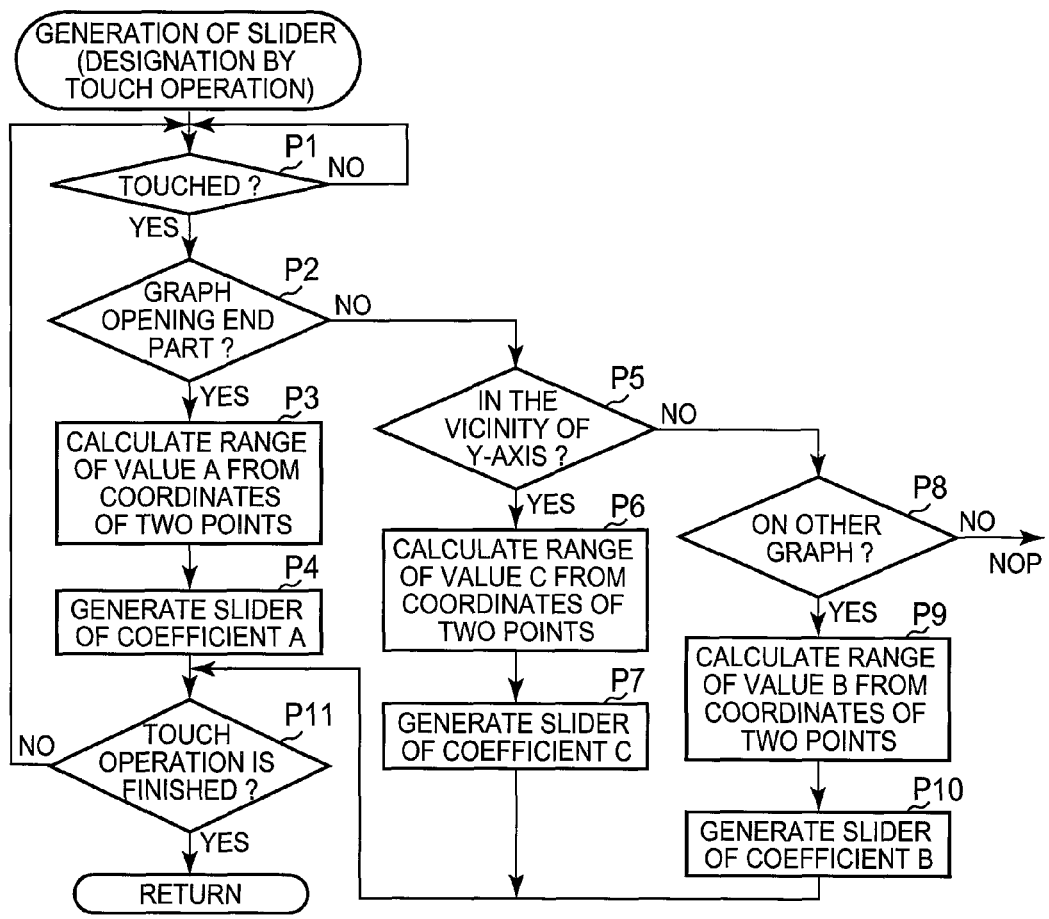
FIG. 10 is a flowchart showing a slider generating process accompanied with a graph display process of a graphing calculator 10 according to another exemplary embodiment.

FIG. 10 is a flowchart showing a slider generating process of a graphing calculator of another exemplary embodiment.

Figure 11:
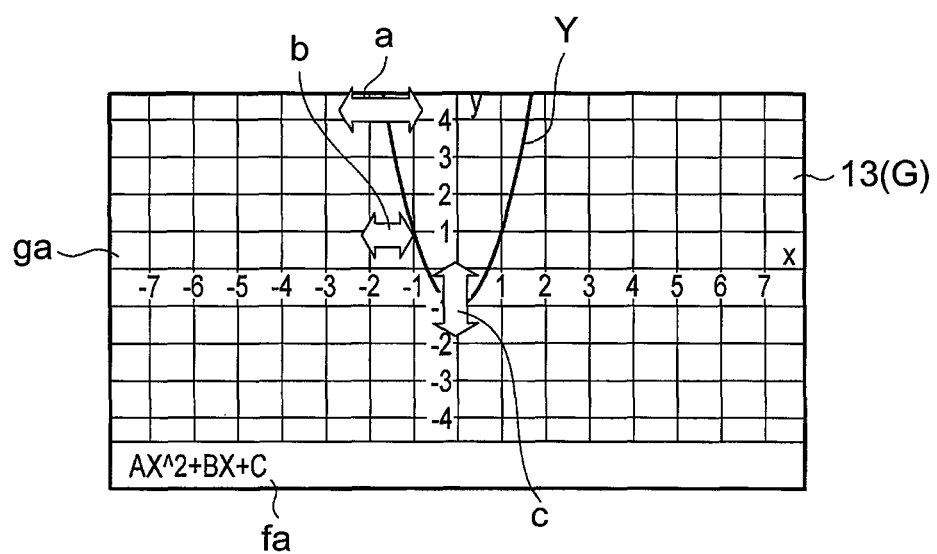
FIG. 11 is a diagram showing contents of a user operation on a graph display screen G accompanied with the slider generating process of the graphing calculator 10 according to another exemplary embodiment.

FIG. 11 is a diagram showing contents of a user operation on a graph display screen G of the graphing calculator of another exemplary embodiment.

A user is supposed to input a functional expression "$Y=AX^2+BX+C$" (including a case that coefficients A, B and C are respectively inputted as constants), the steps S1 to S5 in the graph display process are supposed to be carried out and a graph Y is supposed to be displayed in a graph area ga as shown in FIG. 11. In this case, since the coefficient A may be said to determine an opening degree of a quadratic functional expression, in order to designate a range where the coefficient A is changed, the user touches and designates a range in which the user desires to change the graph in the vicinity of an opening end part of the graph Y as shown by an arrow mark a. In the designation, two points at both ends may be touched or a range thereof may be dragged. When a touch operation for designating the range is detected in the opening end part of the graph (steps P1 and P2 (Yes)), are calculated a value of the coefficient A corresponding to the graph Y which passes a coordinate of the one point of the designated range and a value of the coefficient A corresponding to the graph Y which passes a coordinate of the other point (step P3).

Thus, a slider Sa is generated which has a range of the values of the coefficient A calculated correspondingly to the coordinates of the two points as a numeric value variable range and the slider is stored in a slider data storage area 15f (step P4).

Further, since the coefficient C shows a Y intercept of a graph of a quadratic functional expression, when the user designates a range where the coefficient C is changed, the user also touches and designates a range of Y coordinates of an intersecting part of the graph Y and a Y-axis as shown by an arrow mark c. When a touch operation in the vicinity of the Y-axis is detected (step P5 (Yes)), are calculated a value of the coefficient C corresponding to the graph Y which passes a coordinate of one point of the designated range and a value of the coefficient C corresponding to the graph Y which passes a coordinate of the other point (step P6).

Thus, a slider Sc is generated which has a range of the values of the coefficient C calculated correspondingly to the coordinates of the two points as a numeric value variable range and the slider is stored in the slider data storage area 15f (step P7).

When a touch operation for designating a change range of other part which is not the opening end part of the graph Y, nor the intersecting part with the Y-axis is detected to the graph Y displayed in the graph area ga (step P8 (Yes)) as shown by an arrow mark b, are calculated a value of the coefficient B corresponding to the graph Y which passes a coordinate of one point of the designated range and a value of the coefficient B corresponding to the graph Y which passes a coordinate of the other point (step P9).

Thus, a slider Sb is generated which has a range of the values of the coefficient B calculated correspondingly to the coordinates of the two points as a numeric value variable range and the slider is stored in the slider data storage area 15f (step P10).

Then, when a completion of the touch operation to the displayed graph Y is detected (step P11 (Yes)), the above-described series of slider generating processes is finished and the sliders Sa, Sb and Sc stored in the slider data storage area 15f are displayed in a space area of the graph area ga.

Accordingly, according to the slider function of another exemplary embodiment, the slider which easily changes the value of the coefficient included in the functional expression to display a graph Y' corresponding to the change of the coefficient can be extremely simply generated and displayed by directly touching the part of the graph Y corresponding to the original functional expression which is desired to be changed and the range thereof.

The operating methods by the graphing calculator 10 respectively described in the exemplary embodiments, namely, the methods of the graph display process shown by the flowchart in FIG. 3, the slider generating process shown by the flowchart in FIG. 4, the slider operating process shown by the flowchart in FIG. 5 and the slider generating process of another exemplary embodiment shown by the flowchart in FIG. 10 can be respectively recorded and distributed, as programs that can be executed by a computer, on a memory card (a ROM card, a RAM card or the like), a magnetic disk (a flexible disk, a hard disk or the like), an optical disk (a CD-ROM, a DVD or the like) and a storing medium (the recording medium 17) such as a semiconductor memory. Then, the computer (the CPU 11) of the electronic calculator (10) having the graph display function reads the programs recorded in the recording medium, so that the computer can carry out the same processes by the above-described methods.

Further, data of the programs which realizes the above-described methods can be transmitted through a communication network (a public line) as forms of program codes. The computer (CPU 11) of the electronic calculator 10 having the graph display function can receive the programs in a communication device (the communication control part 18) connected to the communication network. Thus, the computer can execute the same processes by the above-described methods.

The present invention is not limited respectively to the exemplary embodiments as they are. In a stage of embodying, component elements may be modified and embodied within a scope that does not deviate from the gist of the present invention. Further, a plurality of component elements respectively disclosed in the exemplary embodiments may be suitably combined together so that various inventions may be devised. For instance, several component elements may be deleted from all the component elements shown in the exemplary embodiments. Further, the component elements which cover different exemplary embodiments may be suitably combined together.

What is claimed is:

1. A graph display device comprising:
a display;
an input device with a specified key;
a processor; and
a memory storing instructions that, when executed by the processor, control the processor to perform operations comprising:
    accepting an input of one of a first functional expression that includes a first term that contains a variable multiplied by a first coefficient that is inputted as a non-numerical character, and a second functional expression that includes a second term that contains a variable multiplied by a second coefficient that is inputted as a number;
    in response to accepting the input of the first functional expression, and without an input of a specified operation to the specified key of the input device, displaying on the display (i) the inputted first functional expression, (ii) a first graph corresponding to the inputted first functional expression, and (iii) a first user interface object corresponding to the first coefficient, wherein the first graph is redrawn in accordance with a change in a position designated by a user operation with respect to the first user interface object;
    in response to accepting the input of the second functional expression, displaying on the display the inputted second functional expression and a second graph corresponding to the inputted second functional expression without displaying a user interface object corresponding to the second coefficient; and
    while the second functional expression and the second graph are displayed on the display, in response to accepting the specified operation to the specified key of the input device, highlighting the second coefficient and displaying on the display a second user interface object corresponding to the highlighted second coefficient, wherein the second graph is redrawn in accordance with a change in a position designated by a user operation with respect to the second user interface object.

2. The graph display device according to claim 1, the operations further comprising:
accepting an input of, as the second functional expression, a functional expression that includes a plurality of second terms, one of the second terms containing a variable multiplied by a coefficient that is inputted as a number and another one of the second terms containing another coefficient that is inputted as a number; and
in a case in which the input of the second functional expression with the plurality of second terms is accepted, and while the second functional expression and the second graph are displayed on the display:
in response to accepting the specified operation, highlighting the coefficient that multiplies the variable contained in said one of the second terms, and displaying on the display the second user interface object to correspond to the highlighted coefficient, wherein the second graph is redrawn in accordance with a change in the position designated by a user operation with respect to the second user interface object; and
in response to accepting at least another operation after accepting the specified operation, stopping highlighting of the highlighted coefficient and highlighting the another coefficient that is contained in said another one of the second terms, and changing display of the second user interface object such that the second user interface object corresponds to the highlighted another coefficient, wherein the second graph is redrawn in accordance with a change in the position designated by a user operation with respect to the second user interface object.

3. The graph display device according to claim 1, the operations further comprising:
accepting an input of, as the first functional expression, a functional expression that includes a plurality of first terms, one of the first terms containing a variable multiplied by a coefficient that is inputted as a non-numerical character and another one of the first terms containing another coefficient that is inputted as a non-numerical character; and
in response to accepting the first functional expression including the plurality of first terms, and without an input of the specified operation, displaying on the display (i) the inputted first functional expression, (ii) the first graph corresponding to the inputted first functional expression, and (iii) a plurality of first user interface objects corresponding to the coefficient that multiplies the variable contained in said one of the first terms and the another coefficient that is contained in said another one of the first terms;
wherein the first graph is redrawn in accordance with a change in at least one position designated by at least one user operation with respect to the plurality of the first user interface objects.

4. The graph display device according to claim 1, the operations further comprising:
accepting an input of a quadratic functional expression;
displaying, on the display, the inputted quadratic functional expression and a graph corresponding to the inputted quadratic functional expression;
accepting one of a first operation in a vicinity of an opening end part of the graph, a second operation in a vicinity of a Y-axis, and a third operation that is not in the vicinity of the opening end part and is not in the vicinity of the Y-axis;
in response to the first operation, designating a range in which a value of a coefficient of a second-degree term in the inputted quadratic functional expression is changeable, and displaying with the graph a user interface object in which a user can designate the value of the coefficient of the second-degree term within the range;
in response to the second operation, designating a range in which a value of a constant term in the inputted quadratic functional expression is changeable, and displaying with the graph a user interface object in which a user can designate the value of the constant term within the range; and
in response to the third operation, designating a range in which a value of a coefficient of a first-degree term in the inputted quadratic functional expression is changeable, and displaying with the graph a user interface object in which a user can designate the value of the coefficient of the first-degree term within the range.

5. The graph display device according to claim 1, wherein the user operation respect to the first user interface object and the user operation with respect to the second user interface object are user touch input operations; and
wherein the operations further comprise, in a case in which a user touch input operation to an end part of the first user interface object or the second user interface object lasts for a predetermined time duration without changing position, redrawing the touched first or second user interface object by making a value associated with the touched end part of the touched first or second user interface object to be a median of values associated with the redrawn first or second user interface object, and displaying the redrawn first or second user interface object.

6. The graph display device according to claim 1, wherein the specified key is a hardware key.

7. A method for a graph display device comprising a display, and an input device with a specified key, the method comprising:
accepting an input of one of a first functional expression that includes a first term that contains a variable multiplied by a first coefficient that is inputted as a non-numerical character, and a second functional expression that includes a second term that contains a variable multiplied by a second coefficient that is inputted as a number;
in response to accepting the input of the first functional expression, and without an input of a specified operation to the specified key of the input device, displaying on the display (i) the inputted first functional expression, (ii) a first graph corresponding to the inputted first functional expression, and (iii) a first user interface object corresponding to the first coefficient, wherein the first graph is redrawn in accordance with a change in a position designated by a user operation with respect to the first user interface object;
in response to accepting the input of the second functional expression, displaying on the display the inputted second functional expression and a second graph corresponding to the inputted second functional expression without displaying a user interface object corresponding to the second coefficient; and
while the second functional expression and the second graph are displayed on the display, in response to accepting the specified operation to the specified key of the input device, highlighting the second coefficient and displaying on the display a second user interface object corresponding to the highlighted second coefficient, wherein the second graph is redrawn in accordance with a change in a position designated by a user operation with respect to the second user interface object.

8. The method according to claim 7, further comprising:
accepting an input of, as the second functional expression, a functional expression that includes a plurality of second terms, one of the second terms containing a variable multiplied by a coefficient that is inputted as a number and another one of the second terms containing another coefficient that is inputted as a number; and
in a case in which the input of the second functional expression with the plurality of second terms is accepted, and while the second functional expression and the second graph are displayed on the display:
in response to accepting the specified operation, highlighting the coefficient that multiplies the variable contained in said one of the second terms, and displaying on the display the second user interface object to correspond to the highlighted coefficient, wherein the second graph is redrawn in accordance with a change in the position designated by a user operation with respect to the second user interface object; and
in response to accepting at least another operation after accepting the specified operation, stopping highlighting of the highlighted coefficient and highlighting the another coefficient that is contained in said another one of the second terms, and changing display of the second user interface object such that the second user interface object corresponds to the highlighted another coefficient, wherein the second graph is redrawn in accordance with a change in the position designated by a user operation with respect to the second user interface object.

9. The method according to claim 7, further comprising:
accepting an input of, as the first functional expression, a functional expression that includes a plurality of first terms, one of the first terms containing a variable multiplied by a coefficient that is inputted as a non-numerical character and another one of the first terms containing another coefficient that is inputted as a non-numerical character; and
in response to accepting the first functional expression including the plurality of first terms, and without an input of the specified operation, displaying on the display (i) the inputted first functional expression, (ii) the first graph corresponding to the inputted first functional expression, and (iii) a plurality of first user interface objects corresponding to the coefficient that multiplies the variable contained in said one of the first terms and the another coefficient that is contained in said another one of the first terms;
wherein the first graph is redrawn in accordance with a change in at least one position designated by at least one user operation with respect to the plurality of the first user interface objects.

10. The method according to claim 7, further comprising:
accepting an input of a quadratic functional expression;
displaying, on the display, the inputted quadratic functional expression and a graph corresponding to the inputted quadratic functional expression;

accepting one of a first operation in a vicinity of an opening end part of the graph, a second operation in a vicinity of a Y-axis, and a third operation that is not in the vicinity of the opening end part and is not in the vicinity of the Y-axis;
in response to the first operation, designating a range in which a value of a coefficient of a second-degree term in the inputted quadratic functional expression is changeable, and displaying with the graph a user interface object in which a user can designate the value of the coefficient of the second-degree term within the range;
in response to the second operation, designating a range in which a value of a constant term in the inputted quadratic functional expression is changeable, and displaying with the graph a user interface object in which a user can designate the value of the constant term within the range; and
in response to the third operation, designating a range in which a value of a coefficient of a first-degree term in the inputted quadratic functional expression is changeable, and displaying with the graph a user interface object in which a user can designate the value of the coefficient of the first-degree term within the range.

11. The method according to claim 7, wherein the user operation respect to the first user interface object and the user operation with respect to the second user interface object are user touch input operations; and
wherein the method further comprises, in a case in which a user touch input operation to an end part of the first user interface object or the second user interface object lasts for a predetermined time duration without changing position, redrawing the touched first or second user interface object by making a value associated with the touched end part of the touched first or second user interface object to be a median of values associated with the redrawn first or second user interface object, and displaying the redrawn first or second user interface object.

12. The method according to claim 7, wherein the specified key is a hardware key.

13. A non-transitory computer-readable medium storing a program that is executable by a computer of a graph display device comprising a display, and an input device with a specified key, the program being executable by the computer to control the graph display device to perform operations comprising:
accepting an input of one of a first functional expression that includes a first term that contains a variable multiplied by a first coefficient that is inputted as a non-numerical character, and a second functional expression that includes a second term that contains a variable multiplied by a second coefficient that is inputted as a number;
in response to accepting the input of the first functional expression, and without an input of a specified operation to the specified key of the input device, displaying on the display (i) the inputted first functional expression, (ii) a first graph corresponding to the inputted first functional expression, and (iii) a first user interface object corresponding to the first coefficient, wherein the first graph is redrawn in accordance with a change in a position designated by a user operation with respect to the first user interface object;
in response to accepting the input of the second functional expression, displaying on the display the inputted second functional expression and a second graph corresponding to the inputted second functional expression without displaying a user interface object corresponding to the second coefficient; and while the second functional expression and the second graph are displayed on the display, in response to accepting the specified operation to the specified key of the input device, highlighting the second coefficient and displaying on the display a second user interface object corresponding to the highlighted second coefficient, wherein the second graph is redrawn in accordance with a change in a position designated by a user operation with respect to the second user interface object.

14. The non-transitory computer-readable medium according to claim 13, the operations further comprising:

accepting an input of, as the second functional expression, a functional expression that includes a plurality of second terms, one of the second terms containing a variable multiplied by a coefficient that is inputted as a number and another one of the second terms containing another coefficient that is inputted as a number; and in a case in which the input of the second functional expression with the plurality of second terms is accepted, and while the second functional expression and the second graph are displayed on the display:

in response to accepting the specified operation, highlighting the coefficient that multiplies the variable contained in said one of the second terms, and displaying on the display the second user interface object to correspond to the highlighted coefficient, wherein the second graph is redrawn in accordance with a change in the position designated by a user operation with respect to the second user interface object; and in response to accepting at least another operation after accepting the specified operation, stopping highlighting of the highlighted coefficient and highlighting the another coefficient that is contained in said another one of the second terms, and changing display of the second user interface object such that the second user interface object corresponds to the highlighted another coefficient, wherein the second graph is redrawn in accordance with a change in the position designated by a user operation with respect to the second user interface object.

15. The non-transitory computer-readable medium according to claim 13, the operations further comprising:

accepting an input of, as the first functional expression, a functional expression that includes a plurality of first terms, one of the first terms containing a variable multiplied by a coefficient that is inputted as a non-numerical character and another one of the first terms containing another coefficient that is inputted as a non-numerical character; and in response to accepting the first functional expression including the plurality of first terms, and without an input of the specified operation, displaying on the display (i) the inputted first functional expression, (ii) the first graph corresponding to the inputted first functional expression, and (iii) a plurality of first user interface objects corresponding to the coefficient that multiplies the variable contained in said one of the first terms and the another coefficient that is contained in said another one of the first terms;

wherein the first graph is redrawn in accordance with a change in at least one position designated by at least one user operation with respect to the plurality of the first user interface objects.

16. The non-transitory computer-readable medium according to claim 13, the operations further comprising:

accepting an input of a quadratic functional expression;

displaying, on the display, the inputted quadratic functional expression and a graph corresponding to the inputted quadratic functional expression;

accepting one of a first operation in a vicinity of an opening end part of the graph, a second operation in a vicinity of a Y-axis, and a third operation that is not in the vicinity of the opening end part and is not in the vicinity of the Y-axis;

in response to the first operation, designating a range in which a value of a coefficient of a second-degree term in the inputted quadratic functional expression is changeable, and displaying with the graph a user interface object in which a user can designate the value of the coefficient of the second-degree term within the range;

in response to the second operation, designating a range in which a value of a constant term in the inputted quadratic functional expression is changeable, and displaying with the graph a user interface object in which a user can designate the value of the constant term within the range; and in response to the third operation, designating a range in which a value of a coefficient of a first-degree term in the inputted quadratic functional expression is changeable, and displaying with the graph a user interface object in which a user can designate the value of the coefficient of the first-degree term within the range.

17. The non-transitory computer-readable medium according to claim 13, wherein the user operation respect to the first user interface object and the user operation with respect to the second user interface object are user touch input operations; and wherein the operations further comprise, in a case in which a user touch input operation to an end part of the first user interface object or the second user interface object lasts for a predetermined time duration without changing position, redrawing the touched first or second user interface object by making a value associated with the touched end part of the touched first or second user interface object to be a median of values associated with the redrawn first or second user interface object, and displaying the redrawn first or second user interface object.

18. The non-transitory computer-readable medium according to claim 13, wherein the specified key is a hardware key.

* * * * *